United States Patent [19]

Clingan

[11] 4,048,742
[45] Sept. 20, 1977

[54] MINNOW DIPPER WITH AUTOMATIC PARTITIONING ACCESS DOOR

[76] Inventor: Andrew J. Clingan, 2402 Phillips Lane, Texarkana, Tex. 75501

[21] Appl. No.: 740,906

[22] Filed: Nov. 11, 1976

[51] Int. Cl.² ............................................. A01K 97/04
[52] U.S. Cl. ............................................. 43/4; 43/56
[58] Field of Search ............................... 43/4, 55, 56

[56] References Cited

U.S. PATENT DOCUMENTS

| | | | |
|---|---|---|---|
| 2,082,754 | 6/1937 | Peterson | 43/4 |
| 2,474,745 | 6/1949 | Lewis | 43/56 |
| 2,480,924 | 9/1949 | Heger | 43/4 |
| 2,531,551 | 11/1950 | Brecht et al. | 43/4 |
| 2,670,557 | 3/1954 | Pachner | 43/4 |
| 3,726,039 | 4/1973 | Borrelli | 43/56 |
| 3,958,356 | 5/1976 | Clingan | 43/4 |

*Primary Examiner*—Warner H. Camp
*Attorney, Agent, or Firm*—Ralph R. Pittman

[57] ABSTRACT

A dipper for minnows has a cup portion in the shape of a cage-like pentahedral prism of transparent plastic material and is fitted with a normally closed flotation-actuated access door on the rear wall. As the door is closed, a partitioning wall mounted thereon moves inwardly and divides the enclosure into a large upper chamber and a small lower chamber. The forward panel and the rear wall of the enclosure each have a set of downwardly directed teeth along their respective lower and adjacent margins to facilitate fastening a minnow confined within the lower chamber on a fishhook, the forward panel being swingably movable to permit the hooked minnow to be removed therefrom.

3 Claims, 4 Drawing Figures

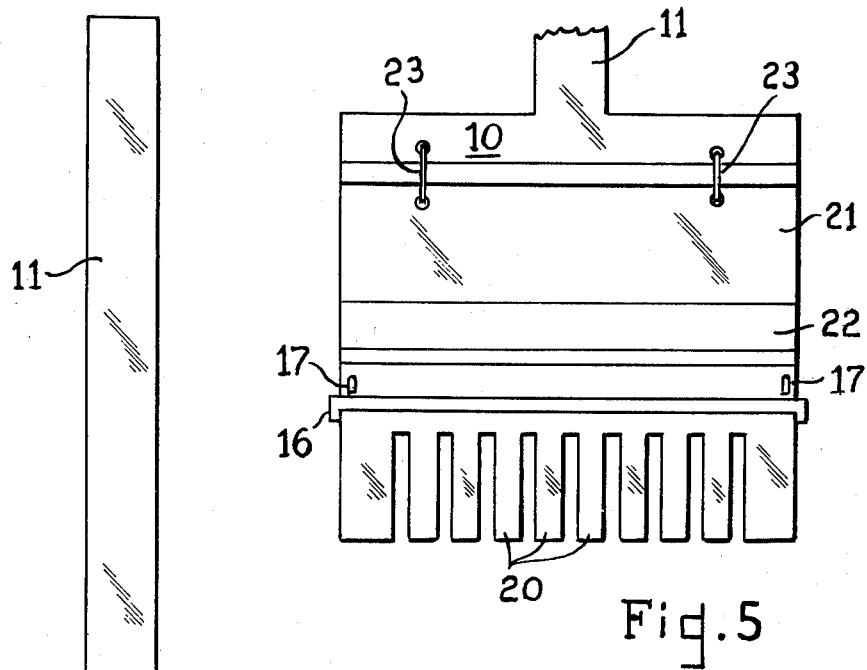
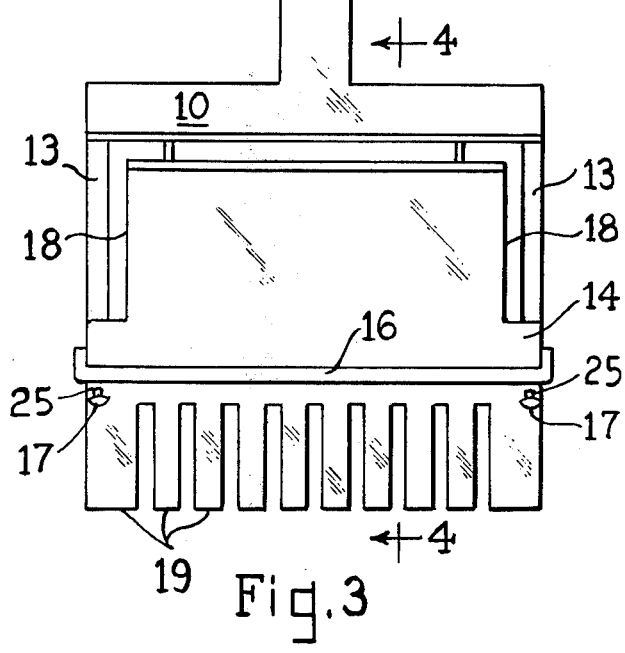
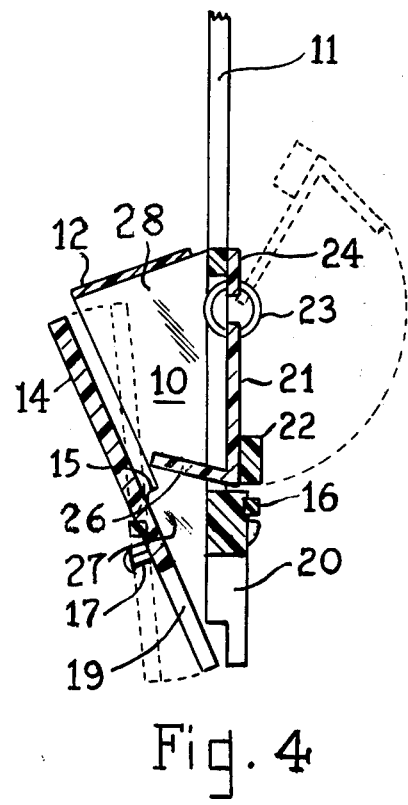

MINNOW DIPPER WITH AUTOMATIC PARTITIONING ACCESS DOOR

BACKGROUND

Live minnows, a widely used fish bait, are usually transported to a fishing location in some type of water-containing minnow buckets. To properly bait a fishhook with a minnow, it is necessary to first remove the minnow from the water with some sort of dipping device, orient the minnow in a direction to conveniently pass the barbed end of the fishhook transversely through the minnow, and then remove the baited hook from the dipping device.

A problem common to all procedures involving the use of minnow dippers is that of confining the dipped minnow so that it can be impaled on a fishhook. Open-top minnow dippers sufficiently deep to preclude self-ejection of the minnow require longhandled tongs for reaching and holding the minnow. Certain previously described opentop dippers are constructed as a combination having an embodied tongs or other minnow-clasping members; such constructions are useful in baiting a hook, but only after the minnow has in some way been suitably positioned and restrained.

SUMMARY OF THE INVENTION

The scope of the present invention is limited to a structural improvement in the minnow dipper construction described in U.S. Pat. No. 3,958,356, dated May 25, 1976. As therein described, the minnow dipper of the present invention utilizes a normally closed flotation-actuated door in the rear wall of an upstanding five-sided, wedgeshaped cage-like cup for capturing a minnow therein. The forward panel of the cup enclosure is fulcrumly mounted to reciprocably swing the lower margin thereof toward and away from the adjacent lower margin of the rear wall, to thereby provide a second opening to the cup enclosure, the latter opening being downwardly directed therefrom.

The flotation-actuated door in the invention herein has an integral forwardly projecting partitioning wall which moves into the cup enclosure as the door is closed, thereby dividing the interior space into a large upper chamber and a much smaller lower chamber.

Sets of complementary teeth are spaced respectively along the lower margins of the rear wall and the forward panel, the upwardly extending interspaces between the opposing teeth being in registration to permit the passage of a fishhook transversely through a minnow disposed in the lower V-shaped portion of the cavity. A movement of the forward panel permits the removal of the baited fishhook from the lower chamber of the dipper.

All of the enclosing members, as well as the handle, are preferably of some material having the same colorlessness and clarity as water; an example of a suitable material is Plexiglas.

BRIEF DESCRIPTION OF THE DRAWING

FIG. 3 is a front elevation showing the offsets in the forward swingable panel and the associated teeth along the lower margin;

FIG. 4 is a fragmentary section taken along the line 4—4 of FIG. 3, the broken lines indicating the respective paths of movement of the swingably mounted forward panel and the rear access door; and FIG. 5 is a rear elevation, showing the rear hinged flotation-actuated door and the teeth along the lower margin of the rear wall, a part of the handle being not shown.

DESCRIPTION OF THE PREFERRED EMBODIMENT

Figure 2:
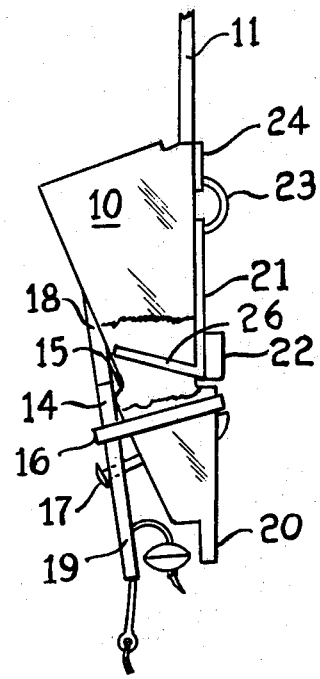
FIG. 2 shows the closed access door following the removal of the dipper from the bucket, a portion of a side panel being broken away to show the interior position of the partitioning wall. A minnow is shown after being impaled on a fishhook and in position to move downwardly from the interior of the cup through the opening resulting from a swingable movement of the forward panel of the cup.
Figure 1:
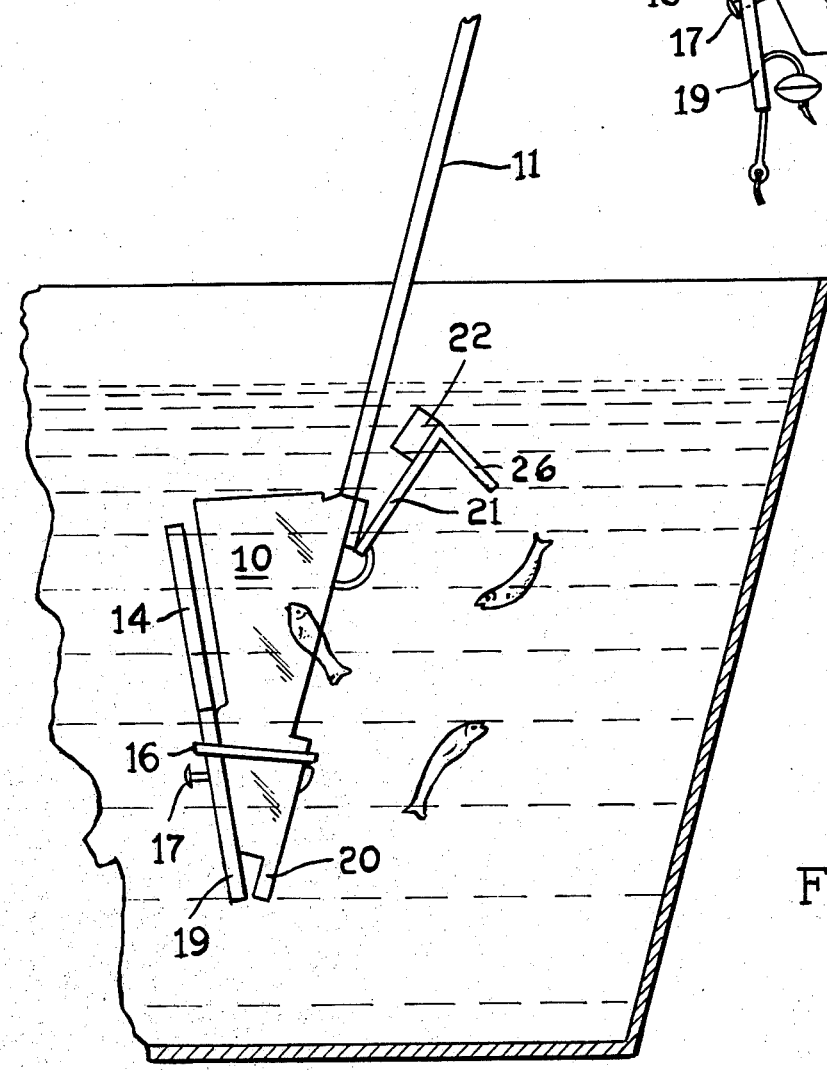
FIG. 1 is a side elevation of the dipper as it appears immersed in a minnow bucket, the flotation-actuated access door having opened in response to the immersion, a minnow being shown entering the interior cavity of the wedge-shaped cup.

In the drawing, FIGS. 1 and 2 illustrate the dipper in service; FIGS. 3, 4 and 5 show in more detail the structural members and their relationship.

The dipper is conveniently constructed of three principal enclosing members; mamely, (1) the generally wedge-shaped body portion 10 including a back wall from which the handle 11 is extended, the forwardly directed triangular side panels 13 and the top closure panel 12; (2) the swingably mounted forward panel 14; and (3) the rear access door 21 and the associated partitioning wall 26.

The dipper cup formed by the above-mentioned closure members is a cage-like enclosure in the shape of an inverted pentahedral triangular prism defining an interior downwardly tapering wedge-shaped cavity.

Access by minnows to the interior of the cup is through an opening in the rear wall of the body portion 10, the opening being normally closed by the transversely extending door 21 which swingably depends from the superjacent transversely extending support panel 14 through the ring hinges 23. An inwardly projecting portion 26 of the door 21 extends forwardly from the lower margin of the closure portion thereof, dividing the cavity of the cup into an upper chamber 28 and a much smaller lower chamber 27.

Along the outer surface of the lower margin of the closure portion of the door 21 is affixed a strip of buoyant material 22, the latter being effective to cause the door 21 to swing to the open position concurrently with a perdetermined directional immersion of the dipper cup in water. A suitable material for use as the buoyant strip is Styrofoam.

Equal upper portions of the forward margins of the triangular side panels 13 are set back at the fulcrum step 15, and equal portions of the lateral margins of the forward panel 14 are offset as indicated at the numerals 18 to permit the upper offset portions of the front panel 14 to enter the wedge-shape cavity of the cup as the front panel 14 swings from the fulcrum step 15.

A tensioned elastic band 16 extends peripherally around a portion of the cup below the fulcrum step 15, normally resiliently holding the front panel 14 in engagement with the non-offset margins of the side panels 13, and a pair of transversely opposed parallel extending motion-limiting guide pins 17 are rigidly secured to the body portion 10 below the elastic band 16, extending forwardly through and beyond registering apertures 25 in the marginal portions of the front panel 14, the swingable movement of the latter being limited by the projected heads of the guide pins 17.

The respective adjacent lower margins of the rear wall of the body portion 10 and the panel 14 are formed as equally spaced downwardly directed complementary sets of teeth 19 and 20, the upwardly extending recesses defined by the interspaces being of like dimensions and in mutual registration.

In use, the dipper is first tilted slightly in a clockwise direction to assure that the flotation-actuated door will swing upwardly to open when the cup is immersed in water. FIG. 1 illustrates the dipper in a minnow bucket, the door having opened to permit the ingress of a minnow. The manipulation of the dipper is continued until the minnow is positioned in the small lower chamber 27 of the cup, then tilted slightly in a counterclockwise direction to enable the access door to close and thus confine the minnow within the lower chamber of the cup.

All water drains from the dipper as it is retracted, and the minnow falls into the lower tapering toothed portion of the cup. The partitioning wall portion of the access door so restricts the upward flouncing movement of the minnow as to enable the convenient lateral impalment of the minnow by a fishhook. As shown at FIG. 2, as the upper offset portion of the panel 14 is manually pressed rearwardly into the cup cavity, the toothed lower margin 19 swings about the fulcrum 15 and away from the toothed lower margin 20 to open the bottom of the cup cavity and enable the baited hook to be withdrawn. Upon release, the swingable panel 14 is biased to its normal cavity-closing position by the elastic band 16, and with the rear access door in the normally closed position, the dipper is ready for further use.

What is claimed is:
1. A minnow dipper comprising:
   a normally enclosed cup in the form of a hollow inverted triangular prism;
   the rectangular rear wall of said cup having an intermediate access opening extending between the sides of the cup and a first array of spaced downwardly extending teeth along the lower margin;
   the rectangular front panel being attached to and substantially covering the forward face of the cup and having a second array of spaced downwardly directed teeth along the lower margin in spatially adjacent registration with said first array of teeth;
   a door disposed to normally close said access opening, hinge means suspending said door from the superjacent body portion and buoyant means fixed to said door;
   said door including a closure portion and a partitioning wall portion extending forwardly into the cup enclosure from the lower margin of said closure portion and dividing the cup enclosure to define an upper chamber and a smaller lower chamber;
   said buoyant means being effective to open said door concurrently with the immersion of said cup in water when said cup is disposed in a predetermined angular relationship with a vertical plane; and
   a manipulative handle extending outwardly from the upper margin of said rear wall.

2. The dipper claimed in claim 1, wherein said buoyant means is disposed along and adjacent to the juncture of said partitioning wall portion with the closure portion of said door.

3. The dipper as defined in claim 1, wherein all of the enclosing and partitioning structural members are clear and transparent plastic material.

* * * * *